(12) United States Patent
Le Mentec et al.

(10) Patent No.: US 11,368,058 B2
(45) Date of Patent: Jun. 21, 2022

(54) STATOR ASSEMBLY

(71) Applicant: Dyson Technology Limited, Wiltshire (GB)

(72) Inventors: Laurent Le Mentec, Bristol (GB); Yu Chen, Cheltenham (GB); Tuncay Celik, Swindon (GB); Mate Horvat, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 549 days.

(21) Appl. No.: 16/011,959

(22) Filed: Jun. 19, 2018

(65) Prior Publication Data

US 2018/0366997 A1 Dec. 20, 2018

(30) Foreign Application Priority Data

Jun. 20, 2017 (GB) .................................... 1709836

(51) Int. Cl.
| | |
|---|---|
| H02K 1/14 | (2006.01) |
| H02K 1/18 | (2006.01) |
| H02K 3/18 | (2006.01) |
| H02K 3/52 | (2006.01) |
| H02K 3/32 | (2006.01) |
| F04D 29/40 | (2006.01) |
| H02K 3/28 | (2006.01) |
| F04D 25/06 | (2006.01) |
| H02K 5/22 | (2006.01) |

(52) U.S. Cl.
CPC ........... *H02K 1/141* (2013.01); *F04D 29/403* (2013.01); *H02K 1/185* (2013.01); *H02K 3/18* (2013.01); *H02K 3/28* (2013.01); *H02K 3/325* (2013.01); *H02K 3/524* (2013.01); *F04D 25/0606* (2013.01); *H02K 5/225* (2013.01); *H02K 2201/15* (2013.01); *H02K 2203/06* (2013.01); *H02K 2203/12* (2013.01)

(58) Field of Classification Search
CPC ............ H02K 1/185; H02K 3/18; H02K 3/28; H02K 3/325; H02K 3/524
See application file for complete search history.

(56) References Cited

U.S. PATENT DOCUMENTS

| | | | |
|---|---|---|---|
| 4,188,556 | A | 2/1980 | Hahn |
| 4,255,682 | A | 3/1981 | Toida et al. |
| (Continued) | | | |

FOREIGN PATENT DOCUMENTS

| | | |
|---|---|---|
| DE | 92958 | 7/1897 |
| GB | 2541360 | 2/2017 |
| (Continued) | | |

OTHER PUBLICATIONS

Notification of Reason for Rejection dated May 7, 2019, directed to JP Application No. 2018-116771; 5 pages.
(Continued)

*Primary Examiner* — Thienvu V Tran
*Assistant Examiner* — Bart Iliya
(74) *Attorney, Agent, or Firm* — Faegre Drinker Biddle & Reath LLP

(57) ABSTRACT

A stator assembly including at least one pair of c-shaped stator cores, each c-shaped stator core having a bobbin, and a winding wound around each bobbin, wherein the windings on each adjacent pair of c-shaped stator cores are wound in opposite directions.

9 Claims, 4 Drawing Sheets

(56) References Cited

U.S. PATENT DOCUMENTS

| | | | |
|---|---|---|---|
| 4,752,707 A | 6/1988 | Morrill | |
| 4,774,428 A | 9/1988 | Konecny | |
| 4,833,355 A | 5/1989 | Kawashima | |
| 4,847,526 A | 7/1989 | Takehara et al. | |
| 5,006,745 A | 4/1991 | Nishio et al. | |
| 5,164,622 A | 11/1992 | Kordik | |
| 6,169,350 B1 | 1/2001 | Yang | |
| 6,188,159 B1* | 2/2001 | Fan | H02K 1/141 310/216.026 |
| 6,373,161 B1 | 4/2002 | Khalaf | |
| 2002/0047444 A1 | 4/2002 | Hessenberger et al. | |
| 2002/0113517 A1 | 8/2002 | Takano | |
| 2003/0062797 A1 | 4/2003 | Horng et al. | |
| 2003/0201688 A1 | 10/2003 | Yamamura et al. | |
| 2004/0007935 A1* | 1/2004 | Kimura | H02K 3/522 310/71 |
| 2004/0183388 A1 | 9/2004 | Rittmeyer | |
| 2006/0022544 A1 | 2/2006 | Kinashi | |
| 2006/0071565 A1* | 4/2006 | Stewart | H02K 1/148 310/89 |
| 2007/0182271 A1 | 8/2007 | Sugishima et al. | |
| 2007/0205678 A1 | 9/2007 | Takashima et al. | |
| 2008/0231133 A1 | 9/2008 | Staudemann et al. | |
| 2009/0134734 A1 | 5/2009 | Nashiki | |
| 2009/0309452 A1 | 12/2009 | Tao et al. | |
| 2011/0068647 A1 | 3/2011 | Sakaue et al. | |
| 2011/0297474 A1 | 12/2011 | Aono et al. | |
| 2012/0228983 A1 | 9/2012 | Hill | |
| 2013/0043749 A1 | 2/2013 | Nonoguchi et al. | |
| 2013/0169085 A1 | 7/2013 | Taema | |
| 2014/0028130 A1 | 1/2014 | Sonoda et al. | |
| 2014/0070638 A1 | 3/2014 | Brennvall | |
| 2014/0127056 A1 | 5/2014 | Wang et al. | |
| 2014/0210305 A1* | 7/2014 | Fahimi | H02K 1/141 310/216.026 |
| 2014/0265653 A1 | 9/2014 | Heins et al. | |
| 2015/0035397 A1 | 2/2015 | Okinaga et al. | |
| 2015/0123510 A1* | 5/2015 | Dajaku | H02K 1/141 310/216.106 |
| 2017/0170697 A1 | 6/2017 | Locke et al. | |
| 2018/0152060 A1* | 5/2018 | Rasmussen | H02K 1/14 |

FOREIGN PATENT DOCUMENTS

| | | |
|---|---|---|
| JP | 56-117568 | 9/1981 |
| JP | 7-59283 | 3/1995 |
| JP | 2000-50610 | 2/2000 |
| JP | 2000-261990 | 9/2000 |
| JP | 2002-153003 | 5/2002 |
| JP | 2003-189525 | 7/2003 |
| JP | 2006-288123 | 10/2006 |
| JP | 2006-296146 | 10/2006 |
| JP | 2010-193675 | 9/2010 |
| WO | 2007/010934 | 1/2007 |
| WO | 2013/063662 | 5/2013 |

OTHER PUBLICATIONS

Search Report dated Dec. 7, 2017, directed to GB Application No. 1709836.9; 1 page.
International Search Report and Written Opinion dated Jun. 11, 2018, directed to International Application No. PCT/GB2018/051133; 12 pages.
The First Office Action dated Nov. 21, 2019, directed to CN Application No. 201810569772.5; 16 pages.
Notification of Reason for Refusal dated Jan. 26, 2021, directed to KR Application No. 10-2020-7000613; 8 pages.

* cited by examiner

STATOR ASSEMBLY

REFERENCE TO RELATED APPLICATIONS

This application claims the priority of United Kingdom Application No. 1709836.9, filed Jun. 20, 2017, the entire contents of which are incorporated herein by reference.

FIELD OF THE INVENTION

The present invention relates to a stator assembly for an electric machine.

BACKGROUND OF THE INVENTION

Stator assemblies for electric machines typically comprise a number of stator cores, each stator core often being formed in a c-shape. Each c-shaped stator core has a back and two pole arms extending from the back, with pole faces at the end of each pole arm. A bobbin is provided on the c-shaped stator core, around which is wound a winding. FIG. 1 shows a schematic representation of a typical winding scheme for a stator assembly 1 according to the state of the art. Four c-shaped stator cores 2 are provided, and windings 3 are wound around each stator core 2. Each of the four stator cores and windings are identical. In order to induce an electric field in the c-shaped stator core 2, current is passed through the windings 3. As shown in FIG. 1, if the windings are connected up to positive and negative terminals as shown, then alternating north and south polarities will be induces at the pole faces as indicated.

There is a general desire to improve electric machines, such as brushless electric motors, in a number of ways. In particular, improvements may be desired in terms of size, weight, manufacturing cost, efficiency, reliability and noise.

SUMMARY OF THE INVENTION

This invention provides a stator assembly comprising at least one pair of c-shaped stator cores, each c-shaped stator core having a bobbin, and a winding wound around each bobbin, wherein the windings on adjacent c-shaped stator cores are wound in opposite directions.

As a result, the termination scheme for the windings of the stator assembly can be simplified. By winding the windings on adjacent c-shaped stator cores in opposite directions, the ends of the windings closest each other between the pair of c-shaped stator cores can be energised with the same electric charge. This may result in a simplified and tidier termination scheme, which may allow the size of an electric machine comprising the stator assembly to be made smaller.

An end of a first winding belonging to one c-shaped stator core may be grouped with the closest end of a second winding belonging to an adjacent c-shaped stator core, the ends being grouped so as to form an electric connection there-between. As a result, the number of electric connections to the windings can be halved. Instead of needing to connect up each end of each winding separately, connections to groups of winding ends is possible. This may further permit the size of the termination scheme to be reduced, and an electric machine comprising the stator assembly can be made smaller.

The stator assembly may further comprise a termination block, and the groups of electrically connected winding ends are connected to terminals in the termination block to provide electrical power thereto. A termination block provides a simple interface to allow the windings to be more easily connected to a power supply. By providing groups of winding ends to be connected, the number of terminals required in the termination block can be reduced, and the overall size of the stator assembly, and any electric machine comprising said stator assembly, can be reduced.

The stator assembly may comprise four c-shaped stator cores. With each c-shaped stator core having two poles, this provides a stator assembly having eight poles. The closest ends of adjacent windings may be electrically grouped to form four grouped winding terminations. As a result, only four connections are required to electrically connect the stator assembly to an electric machine.

The stator assembly may further comprise a termination block having bridging terminals that connect diagonally opposing pairs of grouped winding terminations. This provides a simple termination scheme for a stator assembly having four c-shaped stator cores, where a single electrical connection can be provided to a pair of bridged terminals, with each terminal providing an electrical connection to a group of electrically connected winding ends. As a result, a smaller and mechanically simpler stator assembly can be achieved, and the size of any electrical machine comprising the stator assembly can accordingly be reduced.

This invention further provides an electric machine comprising the stator assembly according to anyone of the preceding statements, the electric machine comprising a frame to which the stator assembly is fixed. Each c-shaped stator core may be mounted individually to the frame.

In an embodiment in which the stator assembly comprises a termination block, said termination block may be mounted to the frame adjacent the c-shaped stator cores.

BRIEF DESCRIPTION OF THE DRAWINGS

In order that the present invention may be more readily understood, embodiments of the invention will now be described, by way of example, with reference to the following accompanying drawings, in which.

DETAILED DESCRIPTION OF THE INVENTION

Figure 2:
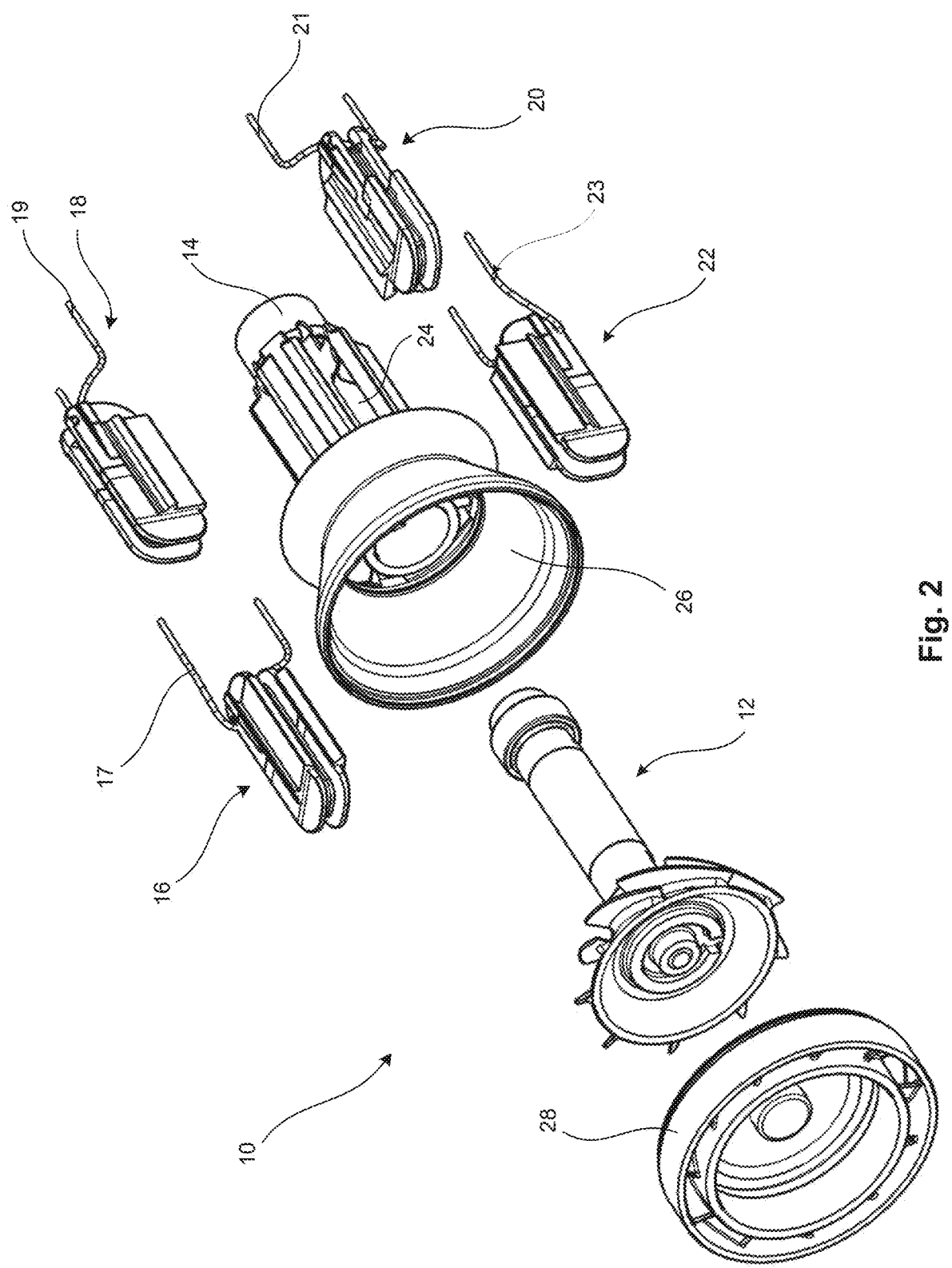
FIG. 2 shows an exploded perspective view of an electric machine.

FIG. 2 shows an exploded perspective view of an electric machine 10. Certain components, such as control electronics and an external housing, are not shown for clarity. The electric machine 10 includes a rotor assembly 12, a frame 14 and a stator assembly comprising four stator components 16, 18, 20 and 22 each comprising a c-shaped stator core. When the electric machine 10 is assembled, the rotor assembly 12 is located within and mounted to the frame 14, and the stator components are located in respective slots in the frame 14. For example, the stator component 20 is located within slot 24 in the frame. The frame 14 may be a one-piece construction, for example moulded as a single object. In the embodiment shown in FIG. 2, the electric machine 1 is a compressor, and as such the rotor assembly 12 includes an impeller, and the frame 14 includes an impeller shroud 26 that covers the impeller. The motor 10 also includes a diffuser 28.

Each of the stator components 16, 18. 20 and 22 have a winding wound around it as referenced by 17, 19, 21 and 23 respectively. A winding can be wound in one of two different directions, which will be referred to as clockwise (CW) and counter-clockwise (CCW). The stator components are provided with windings that are wound in alternating directions, such that the winding of one stator component will be wound in the opposite direction to the windings on each of the two adjacent stator components.

For example, if winding 17 on stator component 16 is wound in a clockwise direction, then the windings 19 and 23 on stator component 18 and 22 will be wound in a counter-clockwise direction and the winding 21 on stator component 20 will be wound in a clockwise direction. The reasons for this will be explored in more detail with reference to FIG. 3.

Figure 3:
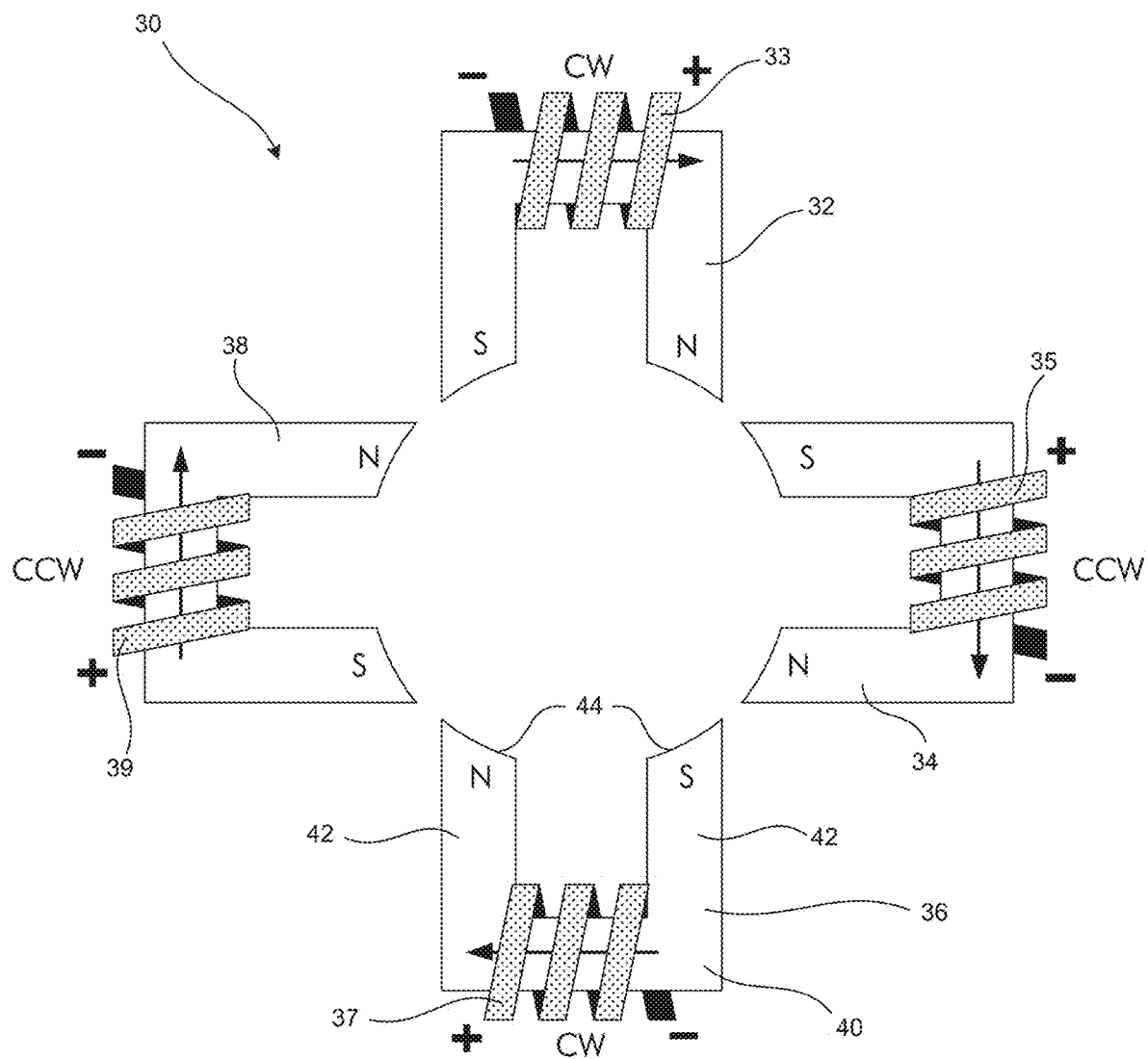
FIG. 3 shows a schematic representation of a winding scheme for a stator assembly according to an embodiment of the present invention.

FIG. 3 shows a schematic representation of a winding scheme such as that employed in the electric machine 10 shown in FIG. 2. The stator assembly 30 comprises four c-shaped stator cores 32, 34, 36, and 38. As referenced on c-shaped stator core 36, each of the c-shaped stator cores 32, 34, 36 and 38 are formed of a stator back 40 with pole arms 42 extending from the back. At the end of each pole arm 42 is a pole face 44. Windings 33, 35, 37, and 39 are wound around each c-shaped stator core 32, 34, 36, and 38 respectively. The windings are wound in alternating directions, as shown by the references CW and CCW provided next to the windings. Windings 33 and 37 are wound in a clockwise direction (CW), and windings 35 and 39 are wound in a counter-clockwise direction (CCW). In order to counter the effect of reversing the winding direction for two of the windings, and to achieve the alternating magnetic polarities required at the pole faces for the electric machine to function, the electrical charge for each winding terminal is also reversed for alternating sets of windings.

Figure 1:
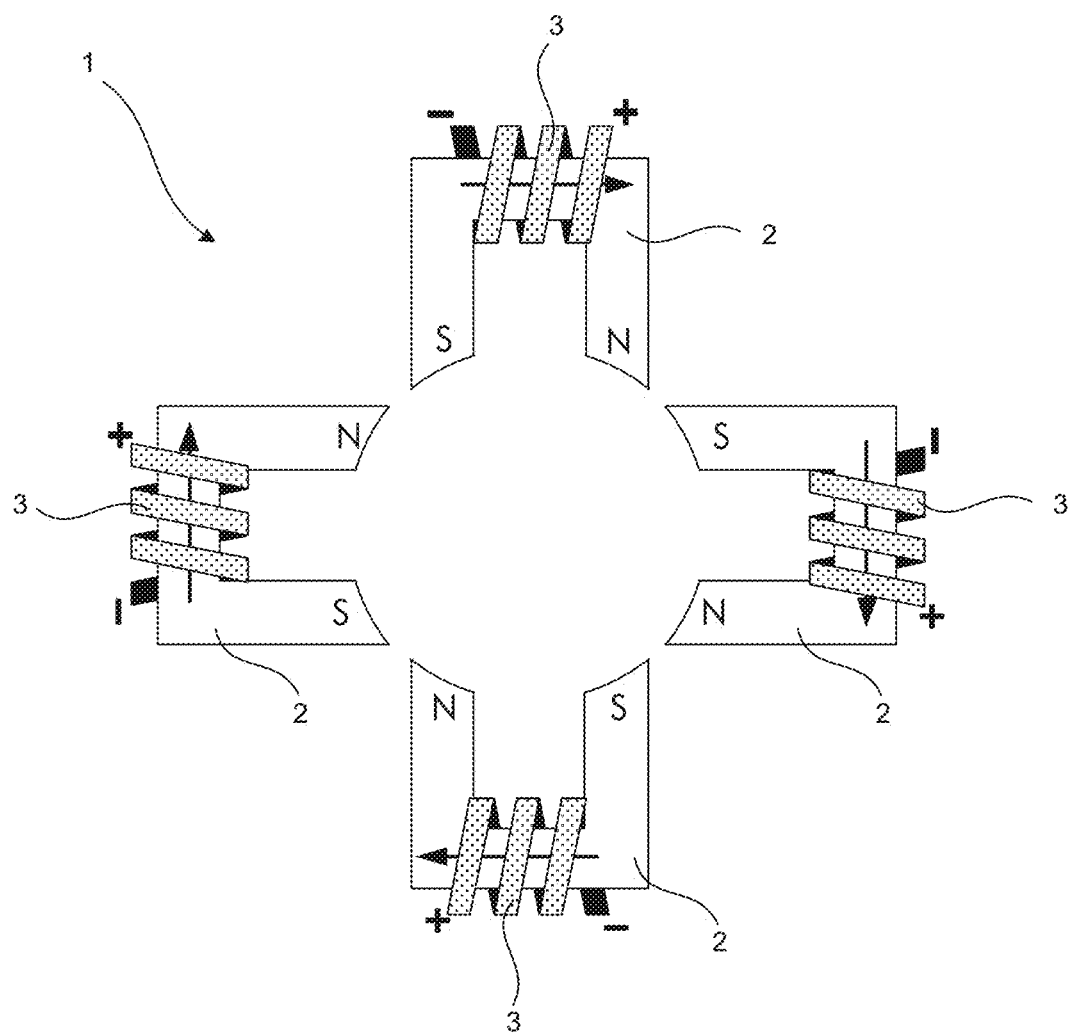
FIG. 1 shows a schematic representation of a winding scheme for a stator assembly according to the state of the art.

For example, comparing the scheme of FIG. 3 with the scheme of FIG. 1, it can be seen that the electrical charge supplied to each end of the windings indicated by the + and − symbols for windings 35 and 39 have been reversed compared to those shown in FIG. 1. This is because the winding direction for windings 35 and 39 has been reversed compared to FIG. 1.

The benefit of the scheme of FIG. 3 over that of FIG. 1 is that similarly charged terminals can be grouped together between adjacent stator cores.

Figure 4:
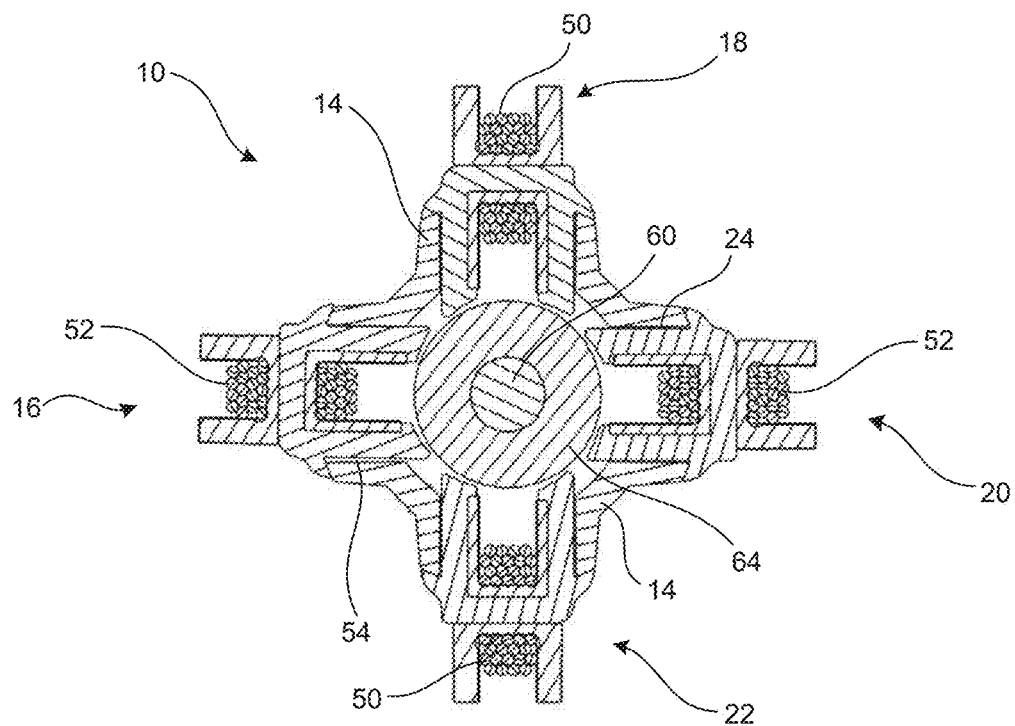
FIG. 4 shows a cross section through an electric machine.

FIG. 4 shows a cross-section of the assembled electric machine 10 through a plane that is perpendicular to the axis of rotation of the rotor assembly 12. The stator components 16, 18, 20, 22 are shown including their respective windings. The c-shaped stator cores within the stator components, and around which the windings are wound, are clearly visible. Stator components 18 and 22 have windings 50 that are wound in a first direction, and stator components 16 and 20 have windings 52 that are wound in a second direction, opposite the first direction. The stator components 16, 18, 20, 22 are shown inserted into their respective slots in the frame 14. For example, stator assembly 16 is inserted into slot 54, whereas stator assembly 20 is shown inserted into slot 24.

When all the stator components 16, 18, 20, 22 are in position in the frame, the pole faces are positioned in close proximity to the magnet 64 of the rotor assembly 12 which is attached to shaft 60.

Figure 5:
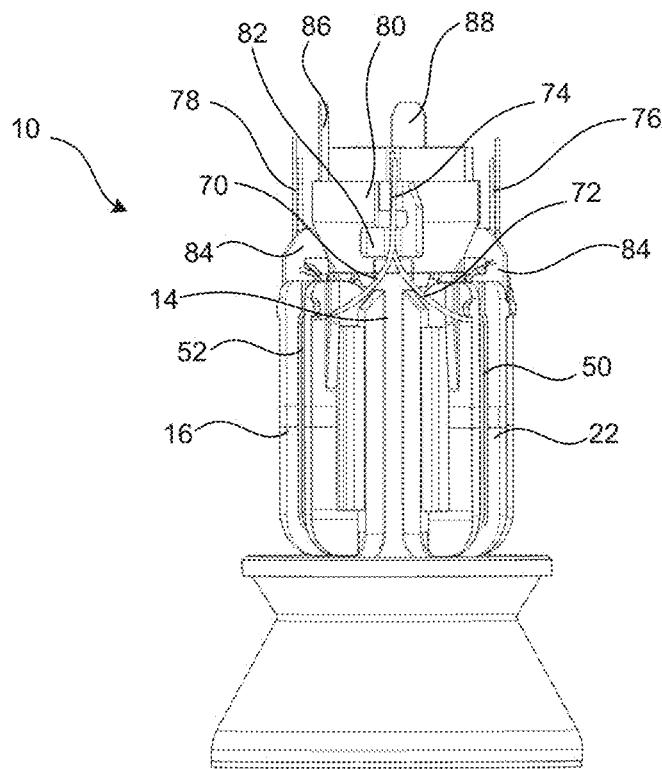
FIG. 5 shows an electric machine.

FIG. 5 shows an assembled electric machine 10. Adjacent stator components 16 and 22 of the stator assembly are shown, and wire ends 70, 72 of the respective windings 52 and 50. Because the windings 52 and 50 have been wound in opposite directions, it is possible to group the end wires 70 and 72 together, as described previously in relation to the schematic representation in FIG. 3. Accordingly, the end 70 of winding 52 belonging to the c-shaped stator core of stator component 16 is grouped with the closest end 72 of winding 50 belonging to the adjacent c-shaped stator core of stator component 22. The ends 70 and 72 are grouped to form an electric connection there-between, resulting in a grouped winding termination 74. Other grouped winding terminations 76 and 78 can be seen which comprise the grouped end wires from other adjacent pairs of stator components. Accordingly, even though there are eight ends of windings that need to be connected up, the stator assembly only has four grouped winding terminations for connection. This can help to keep the termination scheme simple, and reduce the size of the motor.

A termination block 80 is mounted to the frame 14 adjacent to an end of the stator components 16, 18, 20 and 22 and their corresponding c-shaped stator cores. The termination block 80 has terminals 82, 84 to which the grouped winding terminations 74, 76 and 78 are connected. The terminals 82 and 84 are bridging terminals, which extend through the termination block, and connect diagonally opposing pairs of grouped winding terminations. For example, grouped winding terminations 76 and 78 are both connected to a single bridging terminal 84. Accordingly the two bridging terminals 82 and 84 can be connected to a power source from just two power terminals 86 and 88.

Whilst particular embodiments have thus far been described, it will be understood that various modifications may be made without departing from the scope of the invention as defined by the claims.

The invention claimed is:

1. A stator assembly comprising at least one pair of c-shaped stator cores, each c-shaped stator core having a back and two pole arms, a bobbin, and a winding wound around each bobbin, wherein the windings on adjacent c-shaped stator cores are wound in opposite directions and closest ends of adjacent windings are electrically grouped to be energised with the same electric charge, wherein the winding corresponding to the bobbin of a c-shaped stator core is configured to induce alternating north and south polarities at the two pole arms of the c-shaped stator core, and wherein the windings of each bobbin of a c-shaped stator core are collectively configured to induce alternating north and south polarities at a pole arm of a first c-shaped stator core and a pole arm of a second c-shaped stator core that is adjacent to the pole arm of the first c-shaped stator core.

2. The stator assembly of claim 1, wherein an end of a first winding belonging to one c-shaped stator core is grouped with the closest end of a second winding belonging to an adjacent c-shaped stator core, the ends being grouped so as to form an electric connection there-between.

3. The stator assembly of claim 1, wherein the stator assembly further comprises a termination block, and wherein one or more groups of electrically connected winding ends are connected to terminals in the termination block to provide electrical power thereto.

4. The stator assembly of claim 1, comprising four c-shaped stator cores.

5. The stator assembly of claim 4, wherein the closest ends of adjacent windings are electrically grouped to form four grouped winding terminations.

6. The stator assembly of claim 5, further comprising a termination block having bridging terminals that connect diagonally opposing pairs of grouped winding terminations.

7. An electric machine comprising the stator assembly of claim 6, the electric machine comprising a frame to which the stator assembly is fixed.

8. The electric machine of claim 7, wherein each c-shaped stator core is mounted individually to the frame.

9. The electric machine of claim 7, wherein the termination block is mounted to the frame adjacent the c-shaped stator cores.

\* \* \* \* \*